Figure 1:
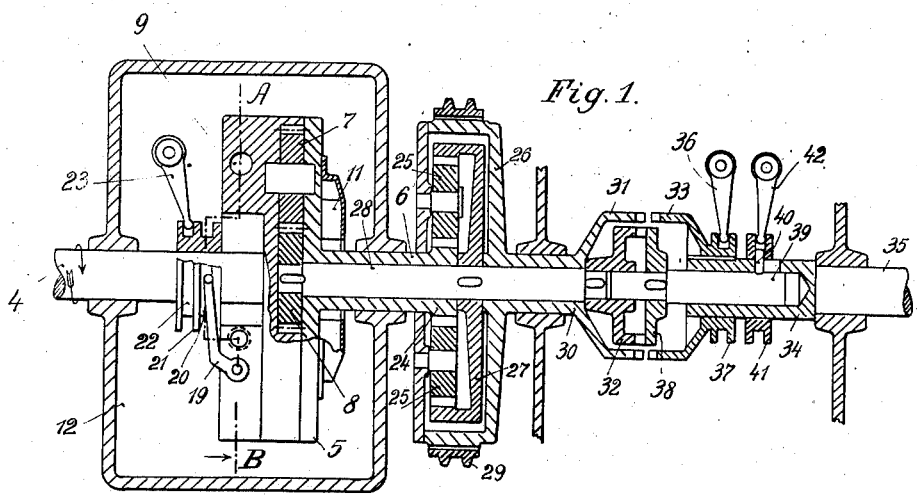

March 26, 1929. H. KRAUSS 1,706,888
CHANGE SPEED, OR CHANGE SPEED AND REVERSING GEARS FOR TRANSFERRING
ROTARY MOTION FROM A DRIVING TO A DRIVEN SHAFT
Filed Dec. 22, 1926

Inventor:
Hans Krauss,
by W. E. Schornborn,
Attorney.

Patented Mar. 26, 1929.

1,706,888

UNITED STATES PATENT OFFICE.

HANS KRAUSS, OF BERLIN-CHARLOTTENBURG, GERMANY.

CHANGE-SPEED OR CHANGE-SPEED AND REVERSING GEARS FOR TRANSFERRING ROTARY MOTION FROM A DRIVING TO A DRIVEN SHAFT.

Application filed December 22, 1926, Serial No. 156,324, and in Germany December 23, 1925.

The object of the invention is to provide a change speed or change speed and reversing gear, the gear ratio of which, varying between zero and one, may be changed while running without any considerable losses of energy occurring as a result of braking, when the gear ratio is less than one. On the contrary the only loss taking place is due to consumption by the generator of running material and a motor fed by the power fluid thus produced. As a rule the entire amount of transmitted energy passing through a generator of power fluid and a motor is insignificant.

The new gear has, in addition, the following advantages over the change speed and reversing gears thus far known.

It renders a continual speed increase from zero to the maximum possible, while the driving and driven shafts are running, thereby ensuring a start without vibrations. The gear allows starting with the driving shaft running at full speed, that is, to the full capacity of the engine. It forms an elastic coupling, as it absorbs shocks, serving at the same time as transmission gear and coupling. It prevents overstrain of the driving shaft, reducing automatically the number of revolutions of the driven shaft, when a certain tension is exceeded, the energy stored up in the running light of the pinions is transferred, when starting to the driven part.

The invention operates on the principle of the driving shaft being connected, not only to a member of the planet wheel gear, but to be a part of the generator of power fluid and to the runner of a motor fed with the running material thus produced, the third member of the planet wheel gear being connected with the other part of the generator of power fluid; and of the stand of the motor fed with the power fluid being firmly secured to the gear box.

The drawing shows two applications of the gear for motor vehicles.

Figure 2:
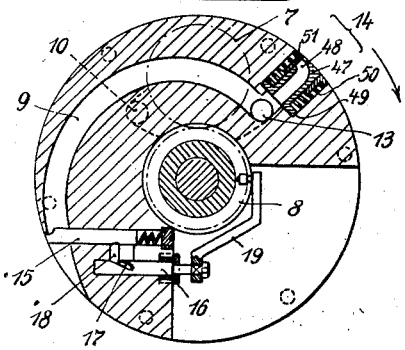

Fig. 1 is a longitudinal section. Fig. 2 is a cross section on line A—B of Fig. 1, and Fig. 3 a partial longitudinal section of another application of the invention.

Driving shaft 4 is unchangingly connected to a wheel 5 and an adjoining hollow shaft 6. Wheel 5 is fitted with a cog-wheel pump consisting of wheels 7 and 8 and possessing a recoil wheel or reaction turbine, the runner of which has only the one canal 9. The pump draws through suction canal 10 the power fluid, preferably oil, out of a scoop-wheel box 11, into which it flows from box 12. The power fluid flows from the pressure canal 13 into canal 9. The cog-wheel pump accordingly generates a power fluid which is utilized in the recoil wheel as the runner of a motor. A safety valve 14 leads from the pressure chamber of the cog-wheel pump into the box. The aperture of the safety-valve is so arranged and so constructed, that the power fluid coming out passes with reactionary action from wheel 5 over into box 12. The slide-valve 47 is constructed like a nozzle, opening at a tangent to the reaction turbine and opposite to its direction of rotation. The slide-valve 47 is provided at its lower end with a flange 49, against which the spring 50 presses, which rests on box 51 which is also provided with a flange. Canal 9 can be closed by a throttle valve 15, the front surface of which also has a nozzle-shaped aperture. Opening and shutting are performed by means of a shaft 16 with a screw-shaped slit 17, into which a rigid cross-pin 18 on the slide-valve 15 catches. A lever 19 set square on shaft 16 engages one groove 20 of a socket 21, a setting lever 23 engaging the other groove 22. By setting lever 23 the slide can also be moved back and forth. In order to set the gear, the axle of lever 23 is moved from without by means of a hand lever or the like.

The sun wheel 24 of the planet wheel gear is connected with the hollow shaft 6. The pinions 25 revolve in a corresponding number of bearers 26. The exterior wheel 27 is keyed onto shaft 28, on the extremity of which one part of the cog-wheel pump is keyed on, inside of wheel 5.

The planet wheel bearer 26 can be braked securely by means of a brake strap 29 on the gear box. It is secured firmly to one end of a hollow shaft 30 enclosing the shaft 28, one half 31 of the forward coupling being connected to the other end of said shaft 30, whereby one half 32 of the backing coupling is keyed onto the corresponding extremity of shaft 28. The other half 32 of the forward coupling is reversible, but connected with the hollow end 34 of the driven shaft 35 in such manner as to shift lengthway and governed by a coupling lever 36 meshing into the groove of a socket 37. The second half of the backing coupling is keyed onto the shaft 39 which slides lengthway in the hollow shaft 34, being connected by a pin 40 to socket 41 which is governed by the second coupling lever 42.

The arrangement above described contains a planet wheel gear with three members, the sun wheel 24, the planet wheels 25 and the outer wheel 27, of which sun wheel 24 is connected to one part of the generator (cog-wheel 7 of the cog-wheel pump 7/8), the planet wheels 25 can be connected through their bearings by means of a coupling mechanism (coupling 31/33), the outer wheel 27 being connected with the outer part of the generator of power fluid (cog-wheel 8 of pump 7/8), the runner (recoil wheel 5) of a motor fed with the power fluid produced by said generator, and the driving shaft.

Figure 3:
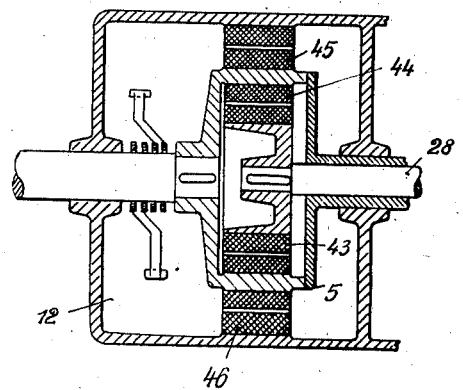

In the modification shown in Fig. 3 a dynamo serves as the generator of power fluid, one part of which, the runner, 43, is keyed onto shaft 28, the stand being connected to wheel 5. The runner 45 of an electric motor is also connected to wheel 5, the current for said motor being furnished by a dynamo, and its stand 46 being connected to the rigid gear box 12. Regulation is effected by changing the strength of field or by series resistances. In order to eliminate the expected slip with direct coupling of the driving and driven shafts, an electro-magnetic coupling or an additional current from another power source can be resorted to.

The gear operates as follows:

Shaft 4 drives wheel 5 and sun wheel 24. When the latter revolves at a different speed than the outer wheel 27, the generator of power fluid 7/8 takes liquid from the scoop-wheel box 11 and feeds under pressure the runner 9 of the motor with it. If the power fluid is not throttled, the entire output consumed in the generator is returned by the motor to wheel 5. There are accordingly no losses of output save those required for driving the two machines. The number of revolutions of the planet wheel pinion and that of the hollow shaft 30 vary in accordance with the difference in number of revolutions of the outer wheel 27 and shaft 28 from that of the sun wheel 24. The various speeds can be transferred to the driven shaft 35 by switching in the forward coupling.

In starting the operation is as follows: Let us assume that shaft 4 is running at ordinary speed, shaft 35 to be stationary and slide-valve 15 to be opened wide. The generator of power fluid and the motor fed by same are then running without load, shaft 28 meets with very little resistance, so that the planet wheel bearer 26 is standing still or nearly so, the outer wheel 27 will have the corresponding back speed of the gear 24/27 as the forward speed of shaft 4 and the sun wheel 24. If the forward coupling 31/33 is now switched in, planet wheel bearer 26 will at first be held entirely fast. In other respects nothing is changed, when running without load. When, however, socket 21 is shifted by lever 23 and slide-valve 15 is gradually closed, the resistance in the generator of power fluid is increased, seeing that the power fluid is throttled, resulting in a decreased number of revolutions of shaft 28 and the outer wheel 27. The result is a slow starting up of the planet wheel bearer 26 and the shaft 35 thereby driven. Through progressive throttling of the running material the speed of the outer wheel 27 is gradually reduced, passes over the stand-still point to the forward run and finally assumes the same speed as sun wheel 24, when the power fluid is entirely shut off by slide-valve 15. Then the generator of power fluid, the motor pertaining thereto and the planet wheel gear are shot off, and shaft 4 drives shafts 30 and 35 directly.

The outlet port of the reaction turbine (canal 9) is in this way regulated by slide-valve 15, until complete closure is effected.

If shaft 35 is submitted to overstrain, when running forward, the pressure of the power fluid is increased, until safety-valve 14 is opened. The resistance of the generator of power fluid is then reduced. The exterior wheel 27 lags behind the sun wheel 24 and the speed of the driven shaft is correspondingly reduced. Should the slide-valve 15 stop in an intermediate position, an equilibrium between the speed of shaft 28, the supply of the generator of power fluid and the consumption of the motor fed thereby is immediately reached, so that the output is again increased in proportion, shaft 35 revolving at a speed between zero and that of shaft 4.

For running backward only one unchangeable speed was provided in the examples shown. Should shaft 4 be running light and planet wheel bearer 26 held fast by brake strap 29 on the box, the outer wheel 27 and shaft 28 revolve backward at a certain velocity determined by the gear ratio between sun wheel 24 and outer wheel 27, and which can be transferred to shaft 35 by switching in the coupling 32/33. In this event slide-valve 15 remains open.

In the event of a similar change of speed arrangement for running backwards be desired as for running forward, a change between forward and backward running by opposite connections of the planet wheel bearer 26 and the outer wheel 27 with the corresponding shafts would have to take place.

The brake 29 can, when running forward, be used as secondary shaft brake.

An essential feature of the invention is that the relative speed of two planet wheel members can be changed by braking and the energy expended for this purpose won back. In this manner an excellent efficiency is ensured for any desired gear ratio. Nevertheless the connection of the generator of power fluid with the runner fed by the power fluid can also be used as a transmission gear and provides an elastic coupling which cannot be submitted to overstrain.

I claim:

1. In a change speed gear the combination of a rotary driving part, a rotary driven part, a planet wheel gear comprising three members, means for connecting the driven part with one member of the planet wheel gear, means for connecting the driving part with a second member of the planet wheel gear, a power fluid generator comprising a housing and a gear pump, a reaction wheel actuated by said driving part and connected with said housing of said power fluid generator, and the gear pump of said power fluid generator actuating and connected with the third member of said planet gear.

2. In a change speed gear according to claim 1, provided with means for non-rotatably securing the member of the planet wheel gear adapted to be connected to the driven part and means for connecting the part of the power fluid generator connected with the third member of the planet wheel gear with the driven part.

3. In a change speed gear the combination of a rotary driving part, a rotary driven part, a planet wheel gear comprising three members, means for connecting the driven part with one member of the planet wheel gear, means for connecting the driving part with a second member of the planet wheel gear, a fluid pressure pump comprising two parts, a reaction turbine having an outlet port and actuated by one part of said fluid pressure pump, and the other part of said fluid pressure pump connected with the third member of said planet wheel gear.

4. In a change speed gear according to claim 3, and means for regulating the outlet port of said reaction turbine.

5. In a change speed gear according to claim 3, means for regulating the outlet port of said reaction turbine and an automatic safety valve controlling the pressure within said reaction turbine.

6. In a change speed gear according to claim 3, means for regulating the outlet port of said reaction turbine, an automatic safety valve controlling the pressure within said reaction turbine and so constructed and arranged to effect the function of an auxiliary nozzle for said reaction turbine when in position to relieve pressure within the turbine.

7. In a change speed gear the combination of a driving shaft, a driven shaft, a planet wheel gear comprising three members, a fluid pressure pump having two parts one of which is connected with the driving shaft, a reaction turbine having a runner and actuated by said fluid pressure pump, means for connecting the driven shaft with one member of the planet wheel gear, means for connecting the driving shaft with a second member of the planet wheel gear, and the other part of said fluid pressure pump connected with and actuating the third member of said planet wheel gear.

8. In a change speed gear the combination of a driving shaft, a driven shaft, a planet wheel gear comprising a central member and an outer member, a carrier for said planet wheel gear, means for connecting the driven shaft with the planet wheel carrier, a fluid pressure generator comprising two parts, a reaction turbine having a runner actuated by one of said parts of the fluid pressure generator, means for connecting the driving shaft with the central member of the planet wheel gear, and the other part of said generator with the outer member of said planet wheel gear.

9. In a change speed gear according to claim 8, and means for locking the carrier of said planet wheel gear, and to connect said outer wheel of the planet wheel gear with the driven shaft.

10. In a change speed gear the combination of a rotary driving shaft, a rotary driven shaft, a planet wheel gear comprising three members, means for connecting the driven shaft with one member of the planet wheel gear, means for connecting a second member of the planet wheel gear to the driving shaft, a rotary wheel or casing connected with said driving shaft, a cog-wheel pump having a pressure chamber and revolving with said casing, a reaction turbine in said casing having a runner with a port in communication with said pressure chamber, an automatic safety valve in said casing for releasing the pressure within said port and pressure chamber, a throttle valve at the outlet of said port, means for manually actuating and adjusting said throttle valve during the rotation of said casing, and means for connecting the cog-wheel pump with the third member of said planet wheel gear.

11. In a change speed gear according to claim 10, in which the automatic safety valve comprises a cylindrical box with an outer flange secured and radially disposed in said rotary casing or wheel, a cylindrical valve with an inner flange and radially sliding within said outer flange, a spring located between the flanges of said valve and box, said valve having a passageway with a nozzle-like aperture adapted to eject fluid at a tangent to the periphery of said rotary wheel or casing.

12. In a change speed gear according to claim 10, in which a suction conduit communicates with the cog-whel pump and a scoop wheel-box on one side of said wheel or casing has its outlet communicating with said suction conduit.

13. In a change speed gear according to claim 10, in which the throttle valve actuating means comprises a stub shaft with a screw-shaped slot, a pin on said throttle valve meshing in said screw-shaped slot, an adjustable and non-rotatable sleeve on said driving shaft, and a lever having its ends connected with said stub shaft and adjustable sleeve.

In testimony whereof I have affixed my signature.

HANS KRAUSS.